Feb. 26, 1935.  W. F. NEUBECK  1,992,674
CONTROL SWITCH FOR VEHICLE SIGNALS
Filed Feb. 15, 1933
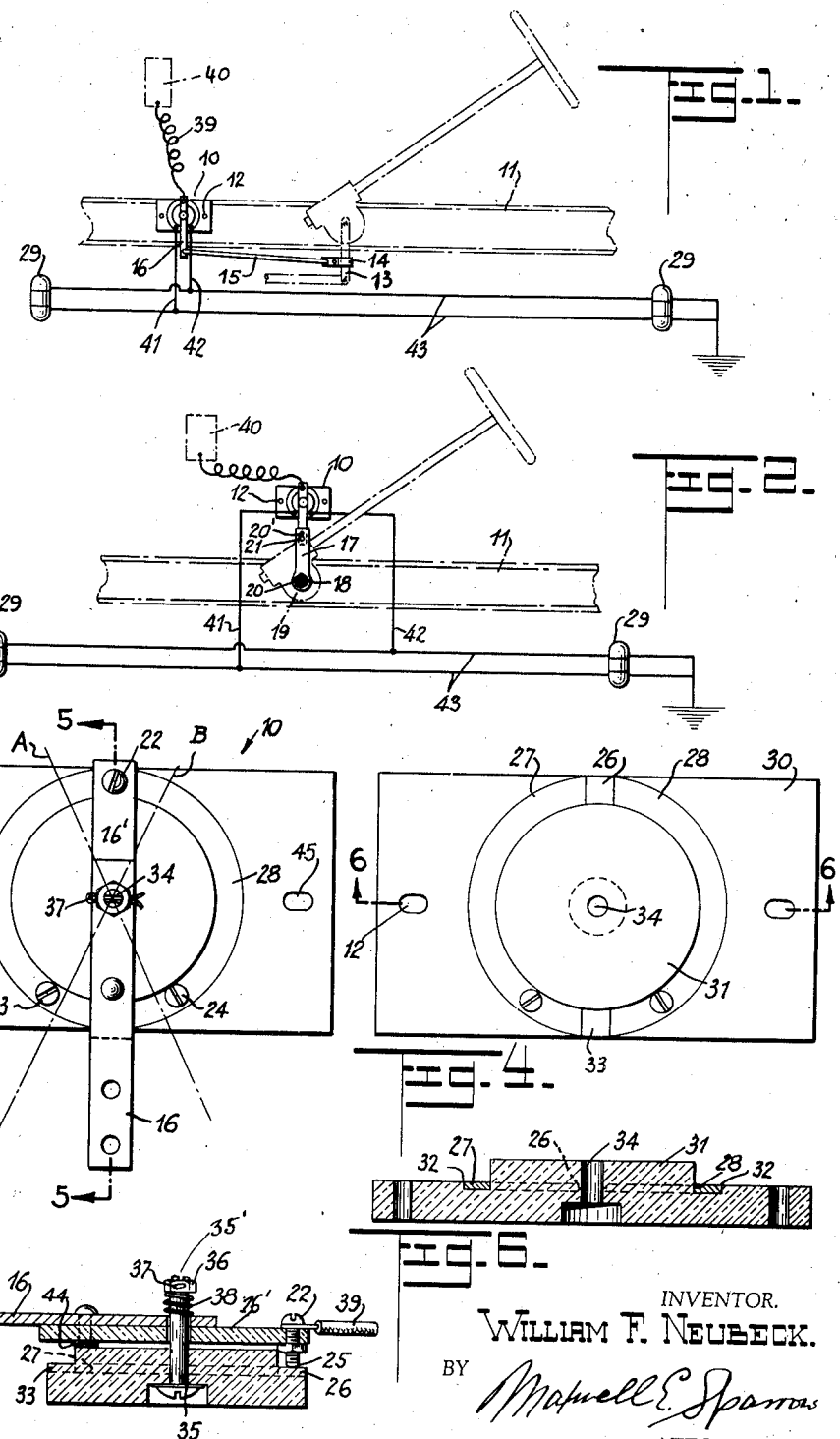
INVENTOR.
WILLIAM F. NEUBECK.
BY
ATTORNEY.

Patented Feb. 26, 1935

1,992,674

UNITED STATES PATENT OFFICE 1,992,674

CONTROL SWITCH FOR VEHICLE SIGNALS

William F. Neubeck, Brooklyn, N. Y.

Application February 15, 1933, Serial No. 656,846

1 Claim. (Cl. 200—59)

This invention relates to improvements in electric switches and has particular reference to a switch used in connection with direction indicators for motor vehicles.

The general object of the invention is to provide an electric switch, which will work automatically when turning the steering gear of the motor vehicle, thereby permitting the driver to give his undivided attention to the operation of the vehicle.

Another object of the invention is to provide an electric switch, which will not work the signal lamp until the hand wheel of the motor vehicle has been turned enough for actually causing the vehicle to deviate from the straight line of direction of its travel.

Another object of the invention is to provide an electric switch, which can be readily installed on vehicles of many different types of manufacture without any difficulty.

A further object of this invention is to provide an electric switch for direction indicators, the said switch consisting of an insulating block carrying current conductor plates spaced from each other, a pivoted switch arm carrying an electric terminal and adapted to be moved back and forth in an arcuate path over the plates with the terminal for sliding engagement with the plates, contact being maintained between the terminal and plates by tension means.

Another object of the invention is apparent from its construction, which makes the same practically fool-proof, nothing to get out of order in the normal operation of the car.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawing depicting a preferred and a modified form has been annexed as a part of this disclosure, and in such drawing, like characters of reference denote corresponding parts throughout all the views, of which:—

Fig. 1 illustrates diagrammatically one of the various ways of application of the electric switch to a motor vehicle, the switch in this case being fastened to the chassis underneath the fender.

Fig. 2 is a diagrammatic view showing another typical application of the electric switch, in this case the switch being fastened within the motor compartment.

Fig. 3 is a detail plan elevational view of the switch.

Fig. 4 is a detail plan elevational view of the switch plate.

Fig. 5 is a sectional view taken along lines 5—5 of Figure 3.

Fig. 6 is a sectional view taken along lines 6—6 of Figure 4.

Switch 10 is fastened to the chassis 11 by means of bolts 12. In Figure 1, the switch 10 is operated by the steering gear arm 13, which has fastened to it a conventional clamp 14. Rod 15 is securely and pivotally connected to said clamp 14 at one of its ends, the other end of rod 15 pivotally connects with switch arm element 16 as clearly illustrated in Figure 5. Switch arm element 16 is preferably made of bendable material to facilitate its being bent, if desired, to clear any obstruction, and is secured in any suitable manner to the insulating arm member 16'. The back and forth movement of steering gear arm 13 will move the switch arm correspondingly.

In Figure 2, the switch 10 is fastened in any suitable way and on any suitable part located within the motor housing. An arm 17 is connected to the end of shaft 18 protruding from the steering gear housing 19 and utilizing the rotatable unit 20. The end of arm 17 which connects with switch arm 15 has a slotted opening 20' to clear the bolt 21 in its back and forth movement.

The switch is provided with three terminals 22, 23 and 24. Contact 22 is threaded through an opening provided therefor in the switch arm and can be manually adjusted and removed. The bolt 22, in addition to forming the movable contact, also constitutes the terminal for connection with the wire 39 leading from the coil in the motor housing. Terminal 22 is also used as the contact point 25 on the switch arm 16. Contact point 25 in its neutral position rests on insulation part 26, but in moving either to position indicated at "A" or "B" will contact with arcuate metal strips 27 or 28, respectively. Terminal 23 connects with metal strip 27 and terminal 24 connects with metal strip 28. It can be readily seen, how the circuits shown in Figures 1 and 2 are closed, lighting the lamps in the signals 29 for either right or left turn.

In further detail, the switch is provided with a block or plate 30 made of any suitable insulating material such as bakelite, fibre, glass, etc., having a projecting pad or disc-like raised part 31 smaller in diameter than the width of plate 30, which part 31 may be separate or made integral with block 30. The two arcuate metal strips 27 and 28 are preferably mounted on switch plate 30 in recesses 32, thereby providing a flush surface of strips 27 and 28 with insulated sections 26 and 33. In the event the disc 31 does not form an integral part of block 30, the strips 27 and 28 may be clamped therebetween.

The switch arm 16—16'' is fulcrumed at 34 by means of a bolt 35 and nut 36. The bolt 35 is slotted at its upper end as shown at 35' the nut 36 being prevented from turning by means of a cotter pin 37 which passes through slot 35'. To maintain the necessary tension at contact point 25, a helical spring 38 may be employed, the tension of the spring being adjusted to a certain extent, by nut 36. A spacer 44 is arranged between disc 31 and substantially one end of switch arm member 16' to provide a free space between disc 31 and the other end of member 16' which carries terminal 22 to allow the latter end of member being urged downward by spring 38 to constantly maintain contact between terminal 22 and strips 27, 28. The strips 27 and 28 are shown as being substantially semi-circular arranged opposite each other to complete a circumference over which the terminal 22 carried by the pivoted switch arm may be made to sweep.

It is understood, however, that the strips 27 and 28 may be of any suitable shape and the switch arm 16—16' may be in one piece. The strips 27, 28 are located such that the contact point 25 of terminal 22 is in sliding engagement therewith, respectively, as the switch arm is caused to move back and forth in its circular path.

Block 30 is provided with the elongated apertures to facilitate the fastening of same in operable position.

Wire 39 connected to the switch arm 16 goes to the coil 40 in the motor housing, while wires 41 and 42 connect terminals 23 and 24 respectively, with the signal lamp circuit wiring 43.

It is believed from the above description that those skilled in the art will have no difficulty in understanding the construction, the method of use and operation of the device herein disclosed and a detailed discussion thereof is unnecessary. The invention is of simple and practical construction and is adapted to accomplish among others all of the objects and advantages herein set forth.

Without further analysis, the foregoing will so fully reveal the gist of this invention that others can by applying current knowledge readily adapt it for various applications without omitting certain features, that, from the standpoint of the prior art, fairly constitute essential characteristics of the generic or specific aspects of this invention, and therefore, such adaptations should and are intended to be comprehended within the meaning and range of equivalency of the following claim.

I claim:

An electric switch comprising an insulating block, a relatively large disc-like raised portion formed on the upper face of the block, said block being formed with a pair of opposed arcuate recesses in its upper face adjacent the disc, stationary contact-forming metal strips arranged in the respective recesses, the upper faces of the strips lying flush with the upper face of the block, a pivot forming element extending through the block and centrally through the disc-like raised portion, an elongated insulated switch arm mounted for swinging movement on the upper end portion of the pivot element and adapted to move across the upper face of the disc-like raised portion, said switch arm projecting beyond the peripheral edge of the disc-like raised portion, an electric contact projecting through one end of the switch arm for brushing engagement with either of the stationary contacts, operating means for the switch arm connected to the other end thereof, a coil spring encircling the upper end of the pivot element for normally urging the switch arm against the upper face of the disc-like raised portion to maintain the contact carried by the switch arm in engagement with the insulating base, and a spacer element carried by the switch arm for engagement with the upper face of the disc-like raised portion.

WILLIAM F. NEUBECK.